3,002,817
PROCESS FOR THE PREPARATION OF
HYDROGEN PEROXIDE
Lucien Villemey, Lyon, France, assignor, by direct and mesne assignments, to Societe d'Electrochimie, d'Electrometallurgie et des Acieries Electriques d'Ugine and l'Air Liquide, Societe Anonyme pour l'Etude et l'Exploitation des Procedes Georges Claude
No Drawing. Filed Oct. 7, 1954, Ser. No. 461,019
Claims priority, application France Oct. 15, 1953
3 Claims. (Cl. 23—207)

The present invention relates to solvents used in the known process for the preparation of hydrogen peroxide, consisting in hydrogenating anthraquinone or alkylanthraquinones or tetrahydroanthraquinone or alkyltetrahydroanthraquinones which will be designated hereinafter under the generic appellation of anthraquinones, then oxidizing by means of oxygen or air the anthrahydroquinone formed so as to regenerate the initial anthraquinone at the same time that hydrogen peroxide is formed. This hydrogen peroxide is then extracted by washing with water the solution containing the regenerated anthraquinone and the hydrogen peroxide. As vehicles for anthraquinone, various solvents have been suggested, either pure or in admixtions, selected in some groups of organic compounds especially resistant to hydrogenation: hydrocarbons, alcohols, ether-oxides, esters.

The object of the present invention is the use, as solvents, of certain ketones which has been found as non hydrogenable under normal conditions wherein anthraquinone may be hydrogenised. Ketones being generally considered as hydrogenisable substances, their use as a non reactive solvent for the hydrogenation of anthraquinones was quite unexpected.

According to the invention, the ketones in question are the ones in the molecule of which each of the radicals adjacent the carbonyl group comprises, at least two carbon atoms, amongst the said ketones, the most convenient are those having an oxidizing power (defined according to Cox and Adkins, J. Am. Chem. Soc., 61, 3369, 1939, with respect to that of diisopropylketone taken as a reference and set equal to unity) equal to or larger than 0.6. Further, they do not form stable peroxides and show other characters required for a solvent used as a vehicle for quinone in the application of the above process. As non limitative examples, may be mentioned diethylketone, diisopropylketone, diisobutylketone, etc.

These ketones show particular advantages as vehicles for anthraquinone in hydrogen peroxide making. The characters required for such solvents are non solubility in water, chemical stability, a dissolving power both for the quinone form and the hydroquinone form, a high distribution factor of hydrogen peroxide in water vs. the solvent, a density sufficiently different from that of water, etc.

The ketone may be, either the single constituent in the solvent, or, admixed with another known solvent, as for instance: hydrocarbons, as alpha-methylnaphthalene, beta-methylnaphthalene, dimethylnaphthalene, ditolylethane, etc.; alcohols, like n-heptanol, octanol, lauric alcohol, etc.; ether-oxides like anisole, phenyl-oxide, etc.; esters, as n-heptyl-acetate, ethylheptanoate, heptylheptanoate, etc.

A specially interesting solvent is diisobutylketone. Its specific gravity at 20° C. compared with the one of water at 4° C. ($D_4^{20}$) is 0.8063.

Solubility in water is 0.064 g. in 100 g. at 20° C. Solubility of water in diisobutylketone is 0.45 g. in 100 g. at 20° C.

*Example 1*

A solution of 2-ethyl-anthraquinone in diisobutylketone is used.

Solubility of ethylanthraquinone in diisobutylketone at 20° C. is 6%.

The distribution factor of hydrogen peroxide between water and the saturated solution of ethylanthraquinone in the solvent is

1:49

The solubility of 2-ethylhydroanthraquinone in diisobutylketone at 20° C. is equal to or larger than 6%. The separation between water or hydrogen peroxide and the solution of ethylanthraquinone in diisobutylketone is quite sharp, so that decantation is very easy.

Further, the rate of hydrogenation of 6% solution of ethylanthraquinone and the rate of re-oxidizing of the hydrogenated solution are particularly high owing to low viscosity of the same.

It will also be noted that contrary to the case of solutions of alkylanthraquinone in usual solvents, solubility of the hydroquinone form is as high as solubility of the quinone form, which makes it possible to completely avoid precipitation of anthraquinone when effecting the complete hydrogenation of a saturated solution of the anthraquinone.

*Example 2*

A solution is used of 2-tertiobutyl-anthraquinone in diisobutylketone.

The solubility of the quinone form at 20° C. is 16.2%.

The distribution factor of hydrogen peroxide between water and a 15% solution of tertiobutylanthraquinone in diisobutylketone is 1:51.

The solubility of hydroquinone is higher than 15%. Decantation is sharp and washing very easy.

All along the repeated cycles comprising, in succession: hydrogenation, oxidation and water extraction of the solution of ethylanthraquinone in diisobutylketone, which make up the preparation process of hydrogen peroxide, no formation of organic peroxides, no hydrogenation or oxidation of diisobutylketone were observed. The yield in hydrogen peroxide was up to 96.6%.

*Example 3*

A solution is used of 2-ethylanthraquinone in diisopropylketone:

The solubility of ethylanthraquinone in diisopropylketone at 20° C. is 8.5.

The distribution factor of hydrogen peroxide between water and the saturated solution of ethylanthraquinone in the solvent is 1/27.

Solubility of 2-ethylhydroanthraquinone in diisopropylketone at 20° C. is equal to or higher than 8.5%.

Decantation is also very quick.

These factors make it possible to use diisopropylketone as a solvent in the preparation of hydrogen peroxide.

*Example 4*

A solution is used of ethyl-anthraquinone in a mixture of 90 volumes of diisobutylketone with 10 volumes of anisole:

Solubility of ethylanthraquinone in this mixture at 20° C. is 9%.

The distribution factor of hydrogen peroxide between water and the saturated solution of ethyl-anthraquinone in the solvent is 1:41.

The solubility of 2-ethylhydroanthraquinone in this mixture at 20° C. is 6.6%.

The separation between water (or hydrogen peroxide) and the solution of ethylanthraquinone in the above mentioned mixture is very sharp; decantation is very easy.

Further, the hydrogenation rate for the 9% solution of ethylanthraquinone in the mixture and the re-oxidation rate of the hydrogenated solution are high.

What I claim is:

1. In the cyclic process of producing hydrogen peroxide comprising the steps of hydrogenating a compound selected from the group consisting of anthraquinone, alkylanthraquinones, tetrahydroanthraquinone and alkyltetrahydroanthraquinones to an anthrahydroquinone, and oxidation of the resultant anthrahydroquinone, the improvement in said process which consists in carrying out the successive hydrogenation and oxidation steps in a common organic solvent for both said anthraquinone and anthrahydroquinone, said solvent consisting of an aliphatic ketone selected from the group having the general formula R—CO—R, in which R is a lower alkyl radical containing at least two carbon atoms, said ketone having an oxidizing power with respect to that of diisopropylketone, taken as a reference and set equal to unity, at least equal to 0.6, and said solvent being non-reactive under the hydrogenating conditions prevailing in said cyclic process.

2. Process according to claim 1, wherein the aliphatic ketone is selected from the group consisting of diethylketone, diisopropylketone and diisobutylketone.

3. In the cyclic process of producing hydrogen peroxide comprising the steps of hydrogenating a compound selected from the group consisting of anthraquinone, alkylanthraquinones, tetrahydroanthraquinone and alkyltetrahydroanthraquinones to an anthrahydroquinone, and oxidation of the resultant anthrahydroquinone, the improvement in said process which consists in carrying out the successive hydrogenation and oxidation steps in a common organic solvent for both said anthraquinone and anthrahydroquinone, said solvent comprising an aliphatic ketone selected from the group having the general formula R—CO—R, in which R is a lower alkyl radical containing at least two carbon atoms, said ketone having an oxidizing power with respect to that is diisopropylketone, taken as a reference and set equal to unity, at least equal to 0.6, said ketone being non-reactive under the hydrogenating conditions prevailing in said cyclic process, and an additional solvent selected from the group consisting of anthraquinone and anthrahydroquinone solvents.

References Cited in the file of this patent

UNITED STATES PATENTS

| | | |
|---|---|---|
| 2,158,525 | Riedl et al. | May 16, 1939 |
| 2,660,580 | Von | Nov. 24, 1953 |
| 2,890,105 | Farrell et al. | June 9, 1959 |

OTHER REFERENCES

Ruggli et al.: "Helvetica Chemica Acta," vol. 12, pp. 79–80 (1929).

Hill et al.: Organic Chemistry, 1945, The Blakiston Co., Philadelphia, p. 224.